April 20, 1937.  C. J. WESTIN  2,077,655
TUBE CLOSING AND SEALING MACHINE
Filed June 18, 1934  3 Sheets-Sheet 3
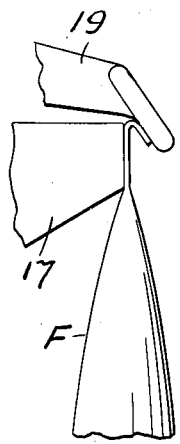
FIG.5.
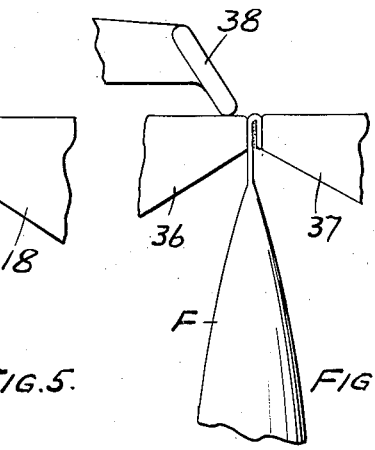
FIG.6.
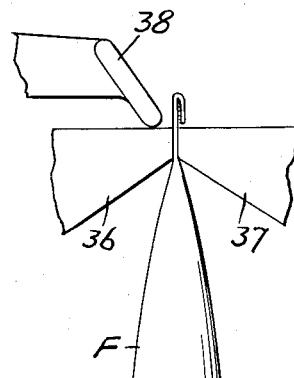
FIG.7.
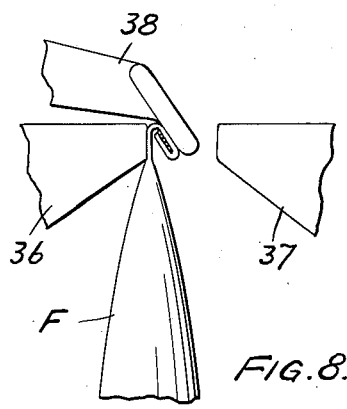
FIG.8.
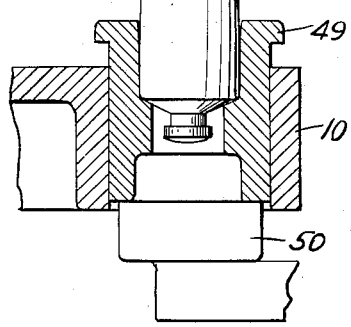
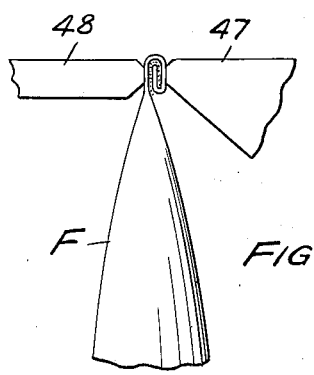
FIG.9.
INVENTOR
Charles J. Westin
BY
Augustus B. Stoughton
ATTORNEY.
WITNESS:

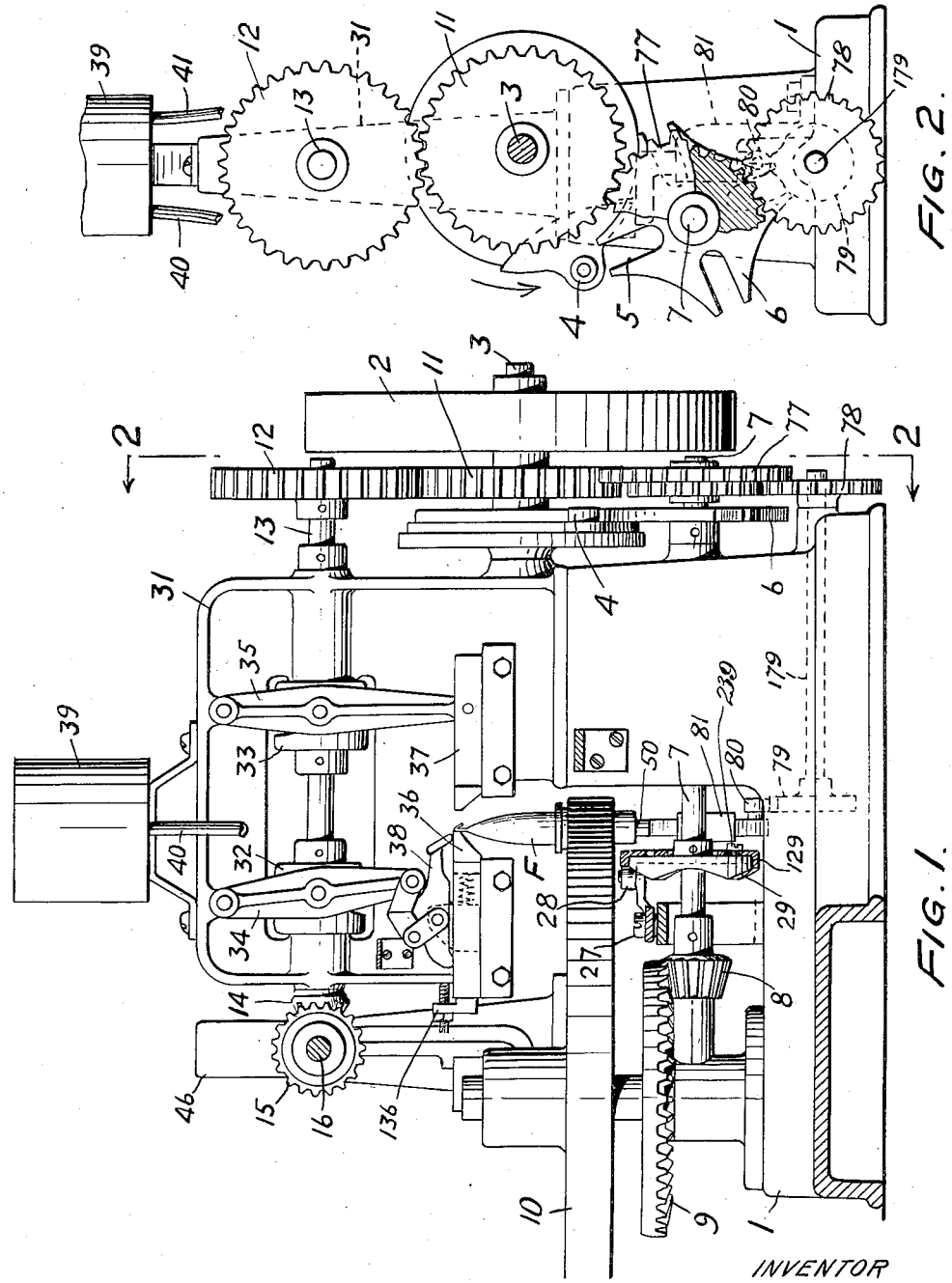

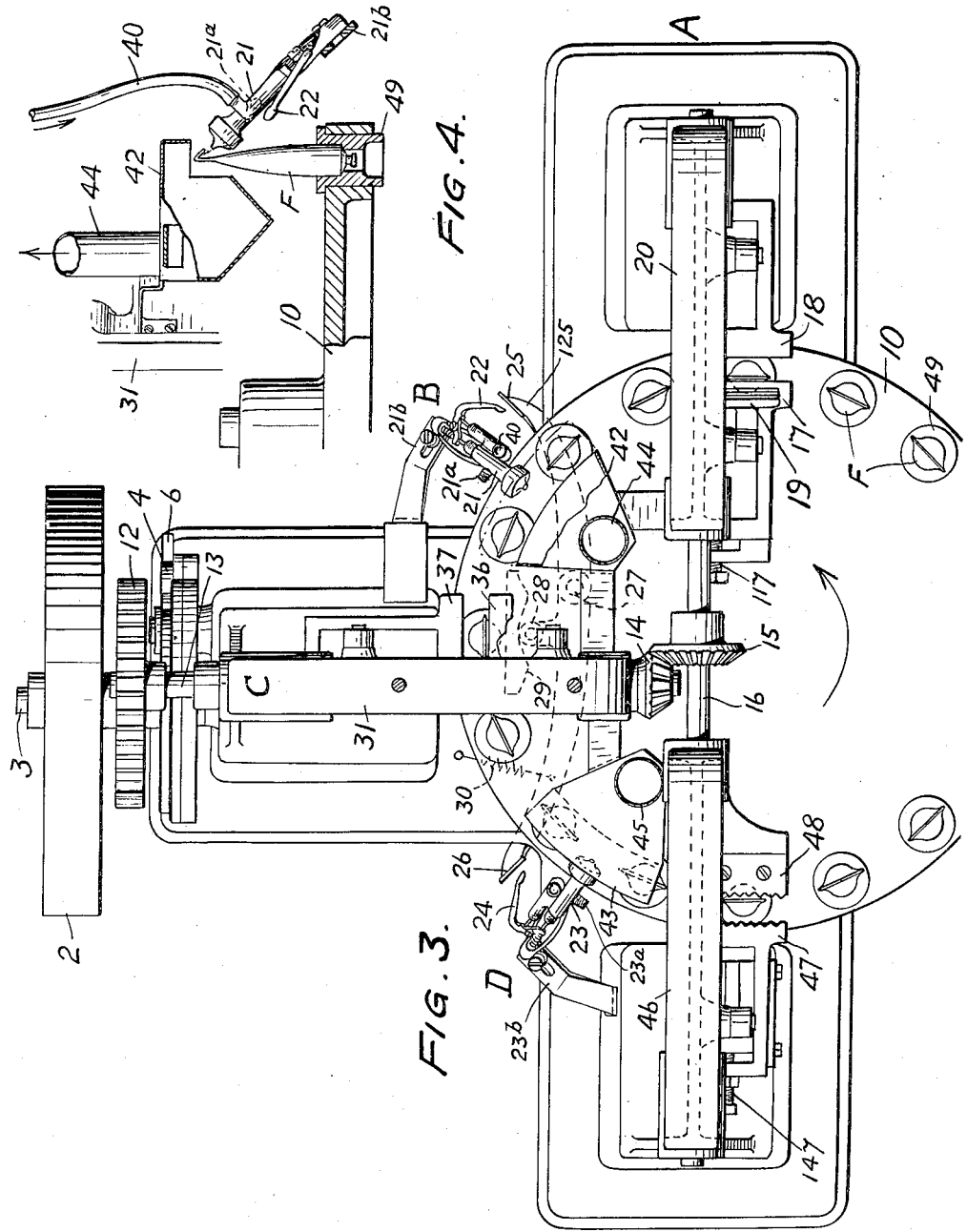

Patented Apr. 20, 1937

2,077,655

UNITED STATES PATENT OFFICE 2,077,655

TUBE CLOSING AND SEALING MACHINE

Charles J. Westin, Philadelphia, Pa., assignor to F. J. Stokes Machine Company, Philadelphia, Pa., a corporation of Pennsylvania Application June 18, 1934, Serial No. 731,083

5 Claims. (Cl. 113—1)

My invention relates to machines adapted to close containers, such as collapsible tubes, and hermetically seal the closure by the application of sealing compound or cement between the folds comprising the closure.

The purpose of my invention is to provide efficient machines for closing and "wet-sealing" the folds in the closures of collapsible tubes, which are commonly used as dispensing containers for fluid or viscous materials such as tooth paste, shaving cream, ointment, food products, etc. These tubes are ordinarily made of some soft metal or alloy, such as tin, lead or aluminum. My machine may also be used for closing and sealing similar containers made from other materials or combinations of material such as celluloid, cellophane, paper, foil or textiles, etc.

More specifically, the purpose of my invention is to provide efficient devices for closing and sealing containers according to the principles and methods disclosed and claimed in my co-pending application No. 667,823, filed April 25th, 1933.

My invention consists in a machine having means for conveying a plurality of tubes, means for closing the tubes and making an initial bend in each of said tubes, means for applying a coating of sealing compound on the surfaces of the initial bend, means to close the coated initial bend, means to make a second bend in each of the tubes, means to apply a coating of sealing compound to the surfaces of the second bend, and means to close the second bend. This machine may also include means for corrugating or indenting the closure.

For a further exposition of my invention, reference may be had to the annexed drawings and specification at the end whereof the novel features of my device will be specifically pointed out and claimed.

In the drawings:

Fig. 1 is an elevation of my device, with parts broken away, in vertical cross-section.

Fig. 2 is a detail view in vertical cross-section on line 2—2 of Fig. 1, with parts omitted.

Fig. 3 is a partial top plan view, with parts omitted and parts broken away.

Fig. 4 is a detail view, with parts in vertical cross-section.

Figs. 5 through 9 are detail views in side elevation, showing the closing and folding steps.

In that embodiment of my invention chosen for illustration in the drawings and description in the specification, my device is shown as consisting of a frame 1, on which all the parts of the machine are supported. Power is applied to the machine by means of a belt pulley 2, or other convenient device, mounted on shaft 3 and serving to turn pin 4, which co-operates with the successive slots 5 in Geneva gear 6 mounted on shaft 7. Shaft 7 carries at its opposite end a gear 8, which co-operates with gear 9 to intermittently rotate table 10, or other means, for conveying a plurality of tubes.

Adjacent the pulley 2, shaft 3 has gear 11 mounted thereon co-operating with gear 12 on shaft 13, which carries at its opposite end a gear 14 co-operating with the gear 15 on a shaft 16.

As is best seen in Fig. 3, my machine consists of five different stations, arranged in counter-clockwise relation. "Station A" includes the flattening or closing and initial bending mechanism. "Station B" includes the first coating device or spray gun. "Station C" includes the first bend-closing and second bending mechanism. "Station D" includes the second coating device or spray gun. "Station E" includes the final folding and crimping or corrugating jaws.

At "station A" there are provided the tube flattening or closing and initial bending jaws 17 and 18, with which co-operates a folder 19. Jaws 17 and 18 and folder 19 are mounted in a bracket 20, which also forms the bearing for one end of shaft 16, from which the jaws 17 and 18 and the folder 19 are operated by cams similar to those shown and described at "station C".

At "station B" there is located a coating device or spray gun, generally indicated at 21, having a lever or operating trigger 22. At "station D" there is located a similar spray gun or coating device 23, likewise having a lever or operating trigger 24. Spray gun 21 is operated by a face 25, and spray gun 23 by a face 26, which are the opposite ends of a lever 125 pivoted at 27 and having a follower 28 mounted thereon in contact with a cam 29 mounted on shaft 7. A spring 30 serves to keep faces 25—26 in such a position that roller 28 is pressed against cam 29. The spray gun used may be of any standard make such as is made by the De Vilbis Company. The guns 21 and 23 may be adjustably fastened to frame 1 by means of brackets 21b and 23b, respectively. If a gravity feed is used for the sealing compound, the tank 39 containing it may be conveniently mounted on housing 31 and connections made through the hose lines 40 and 41. A pressure feed may, of course, be used for the guns. The compressed air used for atomizing and propelling the spray may be furnished from any convenient source and connected to each gun by hose lines or other means at the intakes 21a and 23a.

While I have used a mechanically operated spray gun to illustrate the principles of my invention, it would be just as practical to use any other type of gun as, for example, an electrically or pneumatically operated gun. It is to be understood that the gun is provided with the standard means for regulating the atomizing and directing of the spray-jet.

At "station C" there is a bracket 31, in which shaft 13 is mounted. Shaft 13 carries cams 32 and 33 thereon, which cams drive levers 34 and 35 which, in turn, have closing and folding jaws 36 and 37 and folder 38 pivotally connected thereto, so as to be actuated thereby. Bracket 31 also carries reservoir 39 on its top, from which depend pipes 40 and 41, which supply the coating material to the spray guns 23 and 21, respectively.

At "stations B and D", as is best seen in Figs. 3 and 4, there are provided, opposite the spray guns 21 and 23, hoods 42 and 43, respectively, having vents 44 and 45, and so located as to receive the excess coating material or cement which is not deposited on the tubes. Vents 44 and 45 may be connected to an exhaust system for the removal of the fumes.

At "station E" there is provided a bracket 46, providing a journal for one end of shaft 16, and in which are supported the closing and crimping jaws 47—48, which are actuated from shaft 16 by means similar to those described in connection with jaws 36 and 37 of "station C".

As is best seen in Figs. 4 and 7, dial 10, or other conveyor, carries a plurality of tube-cups 49 therein, which are reciprocable vertically relative to dial 10, so that tube-cups 49 and the tubes therein may each be lifted by a lifter 50, shown in Fig. 7 and Fig. 1 and operated by a mechanism to be described later. The dial 10 is vertically adjustable on gear 9 so that any length of tube, within the range of the machine, may be carried by it at the proper level from station-to-station.

The operation of my machine is most conveniently seen in Figs. 4 through 9. Tubes F are placed one in each tube-cup 49 and conveyed by dial 10 to "station A", where jaws 17 and 18 first come together and close the tube by flattening the walls of the open end against each other a sufficient distance to provide a flat upstanding portion forming the stock used in the closure. The tubes F are placed by table 10 at such a level between the jaws 17 and 18 that a sufficient amount of flat tube-stock extends above the faces of the jaws to form the required width of first fold. While the tube is still clamped between the jaws, the folder 19 slides forward on the top face of jaw 17 and over onto the top face of jaw 18, bending the portion of the tube extending above the jaws down against jaw 18; this jaw is then withdrawn to the right, as shown in Fig. 5, permitting folder 19 to drop down between the jaws and further bend the tube into the position shown in Fig. 5 to form the initial bend. The folder 19 returns to the top face of jaw 17 and this jaw moves away to the left, leaving the tube free to be carried by the conveyor step-by-step to "station C".

It will be noticed from Fig. 3 that the guns 21 and 23 are positioned about half-way between two stopping points in the step-by-step travel of the tubes, so that the tubes, instead of being held stationary by dial 10 relative to the horizontal movement as at "stations A, C, and E", are traveling at the speed imparted to dial 10 past the spray-jet. By this arrangement, I am able to cover the whole lengths of the surface in the horizontal plane comprising the folds with a spray-jet of comparatively small area. The spray-jet is adjusted by the regulating means in combination with the relative position of the gun to apply a coating of only such area as will cover the two opposing and mating surfaces of the bends in the finished folds. A perfect control of the spray-jet area is desirable in order to prevent spattering sealing compound on the surface below the fold or waste some of the compound by shooting it over the top of the bend or on the top surface of the fold.

As the front edge of the tube-bend approaches the spray-gun nozzle, the triggers 22 and 24 are pressed by faces 25 and 26 of lever 125 to start the action of the guns in spraying the sealing compound into the bend of the fold, as is best seen in Fig. 4. Lever 125 is fulcrumed at 127 on a bracket fastened to the base 1. A roller 28 on lever 125 is actuated by the double cam 29—129 mounted on and rotating with shaft 7. It will be noticed that shaft 7 is operated by the fourstation Geneva gear 6, and therefore makes four steps to complete one revolution. Correspondingly, the cams 29—129 have four identical cam surfaces or high points, so that the lever 125 will be actuated in synchronism with the steps of dial 10. The machines are built to handle tubes of varying diameters, which, when flattened out at the closure, will present surfaces of varying lengths in front of the spray-jet. The length of the high points on cams 29—129 are therefore made to operate the gun a suitable length of time for the smallest tube, but this length of time may be increased to suit any size tube by adjusting the outer cam 129 on the rigid cam 29 to increase the length of the high points or cam surfaces. That is to say, the four high points on the two cams 29 and 129 coincide in length when the cams are set for the smallest tube. Cam 129 is clamped to the web of rigid cam 29 by two or more screws 239 (of which but one is shown for the sake of clarity) extending through corresponding slots in the web of the outer cam 129, so that the high points of the two cams may be moved in rotation in relation to each other to form an extended surface of even height, in support of the cam roller 28 for a time suited to the longer tube-closure-surface. The cam roller 28 on lever 125 is made sufficiently wide to cover both cams.

Upon reaching "station C", the coated bend is first closed as shown in Fig. 6. The closing of this initial bend and the pressure exerted on it by the jaws 36 and 37 is controlled by the stop-screw at 136, so that the end of the tube or the first fold is adjacent but slightly spaced from the standing portion of the tube, thereby allowing space between the surfaces for the sealing compound and to prevent squeezing all of the sealing compound out, as might happen if too much pressure was applied. Thus substantially all of the sealing compound or cement may be retained and uniformly spread over the surfaces as indicated in Figs. 6 to 8.

In some cases, tubes having only the initial bend or one sealed fold are quite satisfactory, and the tube may be ejected or finished by the customary crimping or clipping, as the case may be, and then removed from the machine. Usually, however, for the sake of appearance as well as to provide an additional margin of safety in the closure, a second bend and fold is made.

For this purpose the tube, after the closing of the initial bend at C, is lifted by the cup 49, while the jaws are open, a distance equal to the width of the fold desired, Fig. 7, and the second bend, Fig. 8, made in the same manner as described at "station A". From the arrangement of the gearing transmitting the related motion to shafts 13 and 16, it may be noted that shaft 13 will make two revolutions for each tube presented to the jaws 36 and 37 while shaft 16 is only making one revolution. The jaw 37 is actuated by a suitably shaped cam on shaft 13 through the lever 35. Jaw 36 with its folder 38 is actuated by a suitably shaped cam 32 on shaft 13 through the linkage 34 and the yieldable connection between folder 38 and jaw 37. This mechanism is of the usual standard type modified to suit my purpose.

The tube-lifting mechanism may consist of a cup-lifter 50, Figs. 1 and 7, slidably supported in bearing 81 and having a cam follower 80 actuated by a suitably shaped cam 79. Synchronized motion is imparted to cam 79 on shaft 179 through the gear train 11, 77, and 78.

From "station C" the tube is conveyed past "station D", where the surfaces of the second bend, Fig. 8, will receive a coat of sealing compound in the same manner as described for "station B". The gun at "station D" is placed at a lower lever than at B, so as to compensate for the shortening of the tube in making the second bend.

At "station E" the second bend is closed by the jaws 47 and 48 to form the closure shown in Fig. 9. If desired, jaws 47—48 may have appropriately shaped faces so as to form indentations, corrugations, or crimps, in the folded closure and seal. The jaws 47—48 may be set by the adjustment 147 (Fig. 3) to exert a suitable pressure on the folds whereby the sealing compound is evenly distributed over the surfaces within the closure and some of the excess compound extruded from the ends of the folds and about the sides of the closure, so as to form solid caps or blocks completely enclosing or covering the joints or seams between the folds of the closure.

The embodiments chosen for illustration and description of my invention is represented as an independent unit complete in itself to produce a new type of closure and seal on filled tubes; the filling being performed by hand or on a separate filling machine and the filled tubes F subsequently transferred to the cups 49 of my machine. It should, however, be undersood that my device may be arranged so as to form a part or attachment of a filling, closing and sealing machine, or a suitable filling unit may be added to my machine at a station ahead of "station A" to operate in synchronized relation with the conveying means to fill empty tubes placed in the cups 49.

While the device used to show the principles of my invention consists of five stations identifield by letters "A" to "E", it may be understood that some of the stations may be omitted without departing from the principles disclosed. Reference was made above to a closure having only one fold and shown in Fig. 6, and to produce this type of closure some of the stations may be omitted as, for example, "station C" and "station D", and still the desired closure would be obtained or produced by my device.

It will, of course, be understood that the closure, illustrated in Figs. 4 through 9, is merely one type of closure which can be made on my novel machine. Many other types of closure can also be made. I do not desire to limit myself save as the scope of the prior art and of the attached claims may require.

I claim:—

1. In a tube-closing machine, the combination of, means for conveying a plurality of tubes to be closed, means for flattening and initially bending one end of each of said tubes, means for initially spraying coating into the bend in each of said tubes, means for continuing the bend in said tube until the folded end is adjacent to but slightly spaced from the remainder of said tube and for making a second bend in said tube, second means for spraying coating into said second bend, and means for completing said second bend by compressing the bent portion of said tube until said bent portion is adjacent to but slightly spaced from the remainder of said tube.

2. In an automatic tube-closing machine, the combination of, a dial for conveying a plurality of tubes to be closed, means for operating said dial with an intermittent motion, closing means for flattening and making an initial bend in one end of each of said tubes, a spray gun for spraying coating material into said initial bend, closing jaws for continuing said initial bend so that the bent-over portion is adjacent to but spaced from the remainder of said tubes, a folder co-operating with said closing jaws for making a second bend in said tube, a second spray gun for spraying coating into said second bend, and second closing jaws for completing said second bend by folding the bent-over portion until said bent-over portion is adjacent to but slightly spaced from the remainder of said tube.

3. In an automatic tube-closing machine, means for conveying a plurality of tubes to be closed, a shaft for driving said means, a spray gun mounted adjacent said means so as to spray tubes carried by said means, a cam carried by said shaft, a follower actuated by said cam, and a lever actuated by said follower and arranged to actuate said spray gun.

4. In an automatic tube-closing machine, means for conveying a plurality of tubes to be closed, driving means for said first-mentioned means, closing means for flattening and making an initial bend in one end of each of said tubes, coating means for applying a coating of material to the initial bend in said tubes, a cam mounted on said driving means, means for adjusting the operative contour of said cam, and a lever mounted to be operated by said cam and to operate said coating means.

5. In an automatic tube-closing machine, the combination of, means for conveying a plurality of tubes to be closed, means for flattening and initially bending one end of each of said tubes, means for initially spraying coating into the bend in each of said tubes, means for continuing the bend in said tube until the folded end is adjacent to but slightly spaced from the remainder of said tube and for making a second bend in said tube, second means for spraying coating into said second bend, means for completing said second bend by compressing the bent portion of said tube until said bent portion is adjacent to but slightly spaced from the remainder of said tube, and hoods located opposite said means for initially spraying and said second means for spraying so as to receive tubes between said means for spraying and said hoods so that said hoods receive the excess coating sprayed.

CHARLES J. WESTIN.